United States Patent
Sugawara (10) Patent No.: US 10,592,936 B2
(45) Date of Patent: Mar. 17, 2020

(54) TRAVEL ASSISTANCE DEVICE, TRAVEL ASSISTANCE SERVER, AND TRAVEL ASSISTANCE SYSTEM

(71) Applicant: MITSUBISHI ELECTRIC CORPORATION, Tokyo (JP)

(72) Inventor: Hisashi Sugawara, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 379 days.

(21) Appl. No.: 15/564,501

(22) PCT Filed: Jun. 4, 2015

(86) PCT No.: PCT/JP2015/066232
§ 371 (c)(1),
(2) Date: Oct. 5, 2017

(87) PCT Pub. No.: WO2016/194206
PCT Pub. Date: Dec. 8, 2016

(65) Prior Publication Data
US 2018/0082344 A1    Mar. 22, 2018

(51) Int. Cl.
*G06Q 30/02* (2012.01)
*G09B 29/00* (2006.01)
(Continued)

(52) U.S. Cl.
CPC ..... *G06Q 30/0282* (2013.01); *G01C 21/3461* (2013.01); *G01C 21/36* (2013.01);
(Continued)

(58) Field of Classification Search
CPC .... G06Q 30/0282; G06Q 10/02; G06Q 50/14; G01C 21/3691; G01C 21/3461;
(Continued)

(56) References Cited

U.S. PATENT DOCUMENTS

2011/0060524 A1*  3/2011  Miyajima ................. B60T 7/18
                                                                701/300
2013/0085975 A1*  4/2013  Wellhoefer ......... B60R 21/0134
                                                                706/46
(Continued)

FOREIGN PATENT DOCUMENTS

JP    2010-164385 A    7/2010
JP    2013-217713 A    10/2013
(Continued)

*Primary Examiner* — Russell Frejd
(74) *Attorney, Agent, or Firm* — Birch, Stewart, Kolasch & Birch, LLP (57) ABSTRACT

An uttered speech of a user is acquired and recognized, and the recognition result is output. Evaluation information is generated from the recognition result. The position where the evaluation information is generated is detected. A reliability determining unit determines reliability of the evaluation information using post information posted on the Internet within a predetermined distance range based on the position where the evaluation information is generated within a predetermined period based on current date and time and determines whether the evaluation information is to be transmitted. A communication unit performs transmission, to the travel assistance server, of the evaluation information determined to be transmitted by the reliability determining unit, reception of the evaluation information stored in the travel assistance server, and reception of the post information posted on the Internet. An information providing unit provides the evaluation information received by the communication unit from the travel assistance server.

13 Claims, 7 Drawing Sheets

(51) Int. Cl.
*G01C 21/36* (2006.01)
*H04W 4/44* (2018.01)
*G08G 1/0967* (2006.01)
*G08G 1/01* (2006.01)
*G01C 21/34* (2006.01)
*H04L 12/58* (2006.01)
*H04W 4/02* (2018.01)
*G09B 19/14* (2006.01)
*G06Q 10/02* (2012.01)
*G06Q 50/14* (2012.01)
*G10L 15/22* (2006.01)
*G10L 25/78* (2013.01)
*H04W 4/21* (2018.01)
*G10L 15/08* (2006.01)

(52) U.S. Cl.
CPC ......... *G01C 21/3691* (2013.01); *G06Q 10/02* (2013.01); *G06Q 50/14* (2013.01); *G08G 1/01* (2013.01); *G08G 1/012* (2013.01); *G08G 1/0129* (2013.01); *G08G 1/0141* (2013.01); *G08G 1/09675* (2013.01); *G08G 1/096716* (2013.01); *G08G 1/096741* (2013.01); *G08G 1/096775* (2013.01); *G09B 19/14* (2013.01); *G09B 29/00* (2013.01); *G09B 29/007* (2013.01); *G10L 15/22* (2013.01); *G10L 25/78* (2013.01); *H04L 51/00* (2013.01); *H04L 51/30* (2013.01); *H04L 51/32* (2013.01); *H04W 4/02* (2013.01); *H04W 4/44* (2018.02); *G10L 2015/088* (2013.01); *G10L 2015/221* (2013.01); *G10L 2015/223* (2013.01); *H04W 4/21* (2018.02)

(58) Field of Classification Search
CPC ...... G01C 21/36; G09B 29/007; G09B 19/14; G09B 29/00; H04W 4/44; H04W 4/02; H04W 4/21; G08G 1/096741; G08G 1/0129; G08G 1/096775; G08G 1/0141; G08G 1/09675; G08G 1/096716; G08G 1/012; G08G 1/01; H04L 51/32; H04L 51/00; H04L 51/30; G10L 15/22; G10L 25/78; G10L 2015/088; G10L 2015/221; G10L 2015/223

See application file for complete search history.

(56) References Cited

U.S. PATENT DOCUMENTS

| | | | | |
|---|---|---|---|---|
| 2013/0124083 | A1* | 5/2013 | Kratzsch | G01C 21/30 701/410 |
| 2014/0018101 | A1 | 1/2014 | Namba et al. | |
| 2015/0046082 | A1 | 2/2015 | Okamoto | |
| 2016/0078757 | A1* | 3/2016 | Inaba | G09B 29/10 701/119 |
| 2019/0276036 | A1* | 9/2019 | Noguchi | H04W 4/40 |

FOREIGN PATENT DOCUMENTS

| | | |
|---|---|---|
| JP | 2013-242838 A | 12/2013 |
| JP | 2014-016870 A | 1/2014 |
| JP | 2014-203123 A | 10/2014 |
| WO | WO 2012/098651 A1 | 7/2012 |
| WO | WO 2013/136501 A1 | 9/2013 |

\* cited by examiner

FIG. 3A  Node Information

| Node ID | Latitude, Longitude |
|---|---|
| N1 | (X1,Y1) |
| N2 | (X2,Y2) |
| ⋮ | ⋮ |

FIG. 3B  Link Information

| Link Data | | | Cost Data | |
|---|---|---|---|---|
| Link ID | Start Point, End Point | Basic Cost | Additional Cost | Additional Condition |
| L1 | (N1,N2) | 4 | -0.5 | Sparse, Morning |
| | | | +0.3 | Slope |
| | | | - | - |
| | | | ... | ... |
| L2 | (N1,N4) | 3 | +0.5 | Safe, December to February |
| ⋮ | ⋮ | ⋮ | ⋮ | ⋮ |

FIG. 4

| Genre | "Good" | "Bad" | Valid Time |
|---|---|---|---|
| Degree of Congestion of Road | Sparse | Crowded | 1 Hour |
| | Smooth | Congested | |
| | Fast | Not Moving | |
| Cleanness of Road | Clean | Dirty | 3 Hours |
| Width of Road | Wide | Narrow | Not Applicable |
| Ease of Driving on Road | Easy to Drive | Difficult to Drive | Not Applicable |
| Restaurants along Road | Delicious | Not Delicious | Not Applicable |
| ⋮ | ⋮ | ⋮ | ⋮ |

TRAVEL ASSISTANCE DEVICE, TRAVEL ASSISTANCE SERVER, AND TRAVEL ASSISTANCE SYSTEM

TECHNICAL FIELD

This invention relates to a travel assistance device, a travel assistance server, and a travel assistance system collecting and providing evaluation information with respect to surroundings of a moving body.

BACKGROUND ART

In recent years, systems that allow users to perform posting on a computer network via an information terminal and to view texts posted by other users have become widespread. Examples of these systems include social networking services (SNSs), blogs, Twitter (registered trademark), chat, or the like. Texts posted on these SNSs and other media contain a large number of texts about traffic information such as traffic congestion, road closure, or the like.

Moreover, systems including a server that collects evaluation information showing an evaluation of events around a moving body and an information terminal that acquires the evaluation information from the server and displays it on a map to provide convenience during traveling have become widespread.

For example, in Patent Literature 1, a terminal device transmits subjective information that is an evaluation such as good or bad impression a user felt about a road to a server together with position information at the time of evaluation, receives objective information generated by aggregating a plurality of pieces of subjective information from the server, and notifies the user of the objective information.

Further, for example, in Patent Literature 2, an evaluation device acquires area information on an area from a user, determines and accumulates reliability of the area information on the basis of the user's activity area, and displays the accumulated area information and the reliability on an information terminal.

CITATION LIST

Patent Literature

Patent Literature 1: JP 2013-242838 A
Patent Literature 2: JP 2014-16870 A

SUMMARY OF INVENTION

Technical Problem

In order to improve reliability of information posted by a third person, in the related arts, objective information is generated by aggregating a plurality of pieces of subjective information as in Patent Literature 1, or reliability of information posted by "a person who knows the area well" is evaluated highly as in Patent Literature 2.

In the methods as in Patent Literatures 1 and 2 described above, however, there is a problem that it is not possible to improve reliability of information on an event a situation of which changes as time lapses such as traffic congestion of a road and road closing. For example, in the method of Patent Literature 1, subjective information posted when a road is congested as well as subjective information posted after the traffic congestion is resolved are aggregated together, and therefore it is not possible to accurately determine reliability. Further, in the method of Patent Literature 2, "a person who knows the area well" does not always post information when a user views area information, and thus it is not possible to always provide information with high reliability.

The invention has been devised to solve the above problems, and an object of the present invention is to improve reliability of evaluation information on an event a situation of which changes as time lapses such as traffic congestion of a road and road closing.

Solution to Problem

According to the present invention, a travel assistance device generates evaluation information, transmits the evaluation information to a travel assistance server, receives the evaluation information stored in the travel assistance server, and provides the evaluation information to a user. The travel assistance device includes: a speech information detecting unit acquiring and recognizing uttered speech of the user and outputting a recognition result of the recognizing; an information processing unit generating the evaluation information from the recognition result; a position information detecting unit detecting a position where the evaluation information is generated; a reliability determining unit determining reliability of the evaluation information using post information posted on the Internet within a predetermined distance range based on the position where the evaluation information is generated within a predetermined period based on current date and time and determining whether the evaluation information is to be transmitted; a communication unit performing transmission, to the travel assistance server, of the evaluation information determined to be transmitted by the reliability determining unit, reception of the evaluation information stored in the travel assistance server, and reception of the post information posted on the Internet; and an information providing unit providing the evaluation information received by the communication unit from the travel assistance server.

Advantageous Effects of Invention

According to the present invention, reliability of evaluation information is determined using post information posted on the Internet from a position in a predetermined distance range based on the position at which the evaluation information is generated, and within a predetermined period based on the current date and time, and accordingly, whether the evaluation information is to be transmitted is determined. This enables improvement of reliability of evaluation information on an event a situation of which changes as time lapses such as traffic congestion of a road and road closing.

DESCRIPTION OF EMBODIMENTS

To describe the present invention further in detail, some embodiments for carrying out the invention will be described below with reference to accompanying drawings.

First Embodiment

Figure 1:
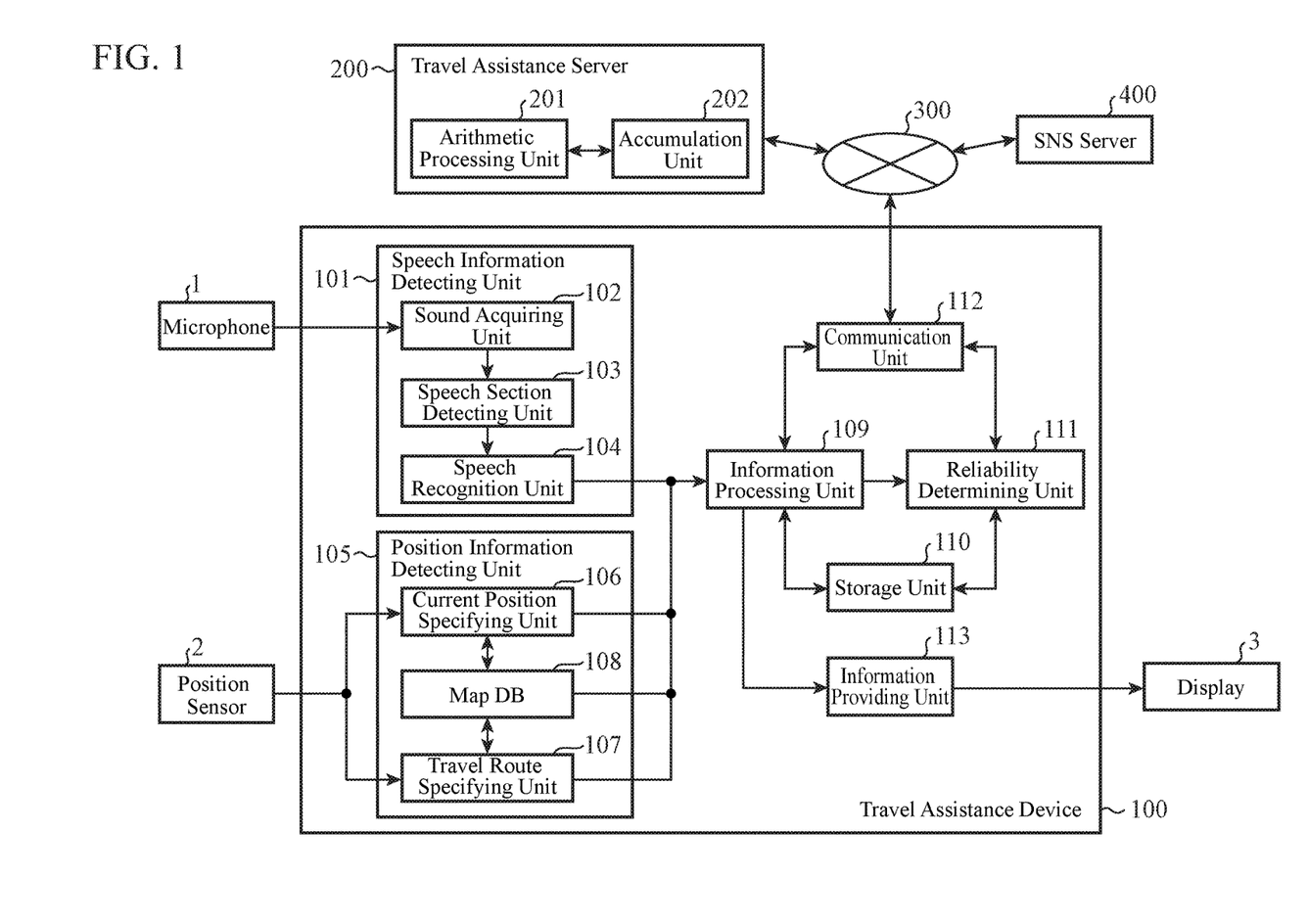
FIG. 1 is a block diagram illustrating a configuration example of a travel assistance system according to a first embodiment of the invention.

FIG. 1 is a block diagram illustrating a configuration example of a travel assistance system according to a first embodiment of the invention. In the travel assistance system, a travel assistance device 100, a travel assistance server 200, and an SNS server 400 are connected via a mobile communication network 300.

The travel assistance device 100 generates evaluation information, transmits the evaluation information to the travel assistance server 200, receives evaluation information stored in the travel assistance server 200, and provides the evaluation information to a user to assist traveling. The travel assistance device 100 is an in-vehicle device such as a navigation device mounted on a moving body such as a vehicle or a mobile information terminal such as a smartphone. A microphone 1, a position sensor 2, and a display 3 are connected to the travel assistance device 100.

The evaluation information includes evaluation of various impressions such as a good impression or a bad impression a user felt about a certain point. Details of the evaluation information will be described later.

The travel assistance server 200 receives and stores evaluation information from one or more travel assistance devices 100 and, when there is a request from any one of the one or more travel assistance devices 100, transmits stored evaluation information to the travel assistance device 100 that made the request.

The SNS server 400 allows a user to post information on the Internet via an information terminal (not illustrated) and to view post information posted by other users. The SNS server 400 is a server for providing services such as an SNS, a blog, Twitter (registered trademark), chat, or the like.

Hereinafter, in order to distinguish between a user of the travel assistance device 100 and a user of the SNS server 400, a user of the SNS server 400 is referred to as a poster.

As illustrated in FIG. 1, the travel assistance device 100 includes a speech information detecting unit 101, a position information detecting unit 105, an information processing unit 109, a storage unit 110, a reliability determining unit 111, a communication unit 112, and an information providing unit 113.

The speech information detecting unit 101 acquires and recognizes uttered speech of a user and outputs the recognition result. The speech information detecting unit 101 includes a sound acquiring unit 102, a speech section detecting unit 103, and a speech recognition unit 104.

The sound acquiring unit 102 A/D-converts sound collected by the microphone 1, acquires the sound as a sound signal in, for example, a pulse code modulation (PCM) format, and outputs the sound signal to the speech section detecting unit 103. This sound signal indicates the speech uttered by the user, sound around the moving body, and the like.

The speech section detecting unit 103 detects a speech section corresponding to the contents uttered by the user from the sound signal acquired by the speech information detecting unit 101, extracts the speech section as speech data, and outputs the speech data to the speech recognition unit 104.

The speech recognition unit 104 has a speech recognition dictionary. The speech recognition unit 104 extracts feature amounts from the speech data extracted by the speech section detecting unit 103, performs speech recognition processing using the speech recognition dictionary on the basis of the feature amounts, extracts a specific keyword included in the recognition result, and outputs the keyword to the information processing unit 109. As a method of the recognition processing, any general method such as the Hidden Markov Model (HMM) method can be used, and thus a detailed description thereof is omitted. Note that the travel assistance device 100 may obtain the recognition result of speech data by using a speech recognition server on a network instead of using the speech recognition unit 104.

The speech recognition dictionary is capable of recognizing keywords used by the information processing unit 109, which will be described later. Hereinafter, a keyword extracted from the recognition result by the speech recognition unit 104 is referred to as a "recognition keyword".

Meanwhile, in a speech recognition function installed in a terminal such as a car navigation system, in general, a user explicitly indicates a start of utterance or other actions to the system. Therefore, in the terminal having a general speech recognition function, a speech recognition start instructing unit such as a button for instructing a start of speech recognition is displayed on a touch panel or installed on a steering wheel. Then, after the speech recognition start instructing unit is pressed by the user, the uttered speech is recognized. That is, when the speech recognition start instructing unit outputs a speech recognition starting signal and the speech recognition unit receives the signal, the recognition processing described above is performed for a speech section detected by a speech section detecting unit that corresponds to the utterance contents of the user from the sound signal acquired by a sound acquiring unit after e signal is received.

On the other hand, the speech recognition unit 104 of the first embodiment always recognizes utterance contents of a user even if there is no instruction to start speech recognition by the user as described above. That is, even when the speech recognition unit 104 does not receive a speech recognition starting signal, the speech recognition unit 104 repeats the processing of: extracting feature amounts from the sound signal acquired by the sound acquiring unit 102 with respect to the speech data of the speech section detected by the speech section detecting unit 103 that corresponds to the utterance contents of the user; performing recognition processing using a speech recognition dictionary on the basis of the feature amounts; and outputting the recognition keywords.

The position information detecting unit 105 detects a position and other information of the travel assistance device 100. The position information detecting unit 105 includes a current position specifying unit 106, a travel route specifying unit 107, and a map database (DB) 108.

Using the detection result of the position sensor 2, the current position specifying unit 106 specifies the current position of the travel assistance device 100 or the moving body mounting the travel assistance device 100, and outputs the current position to the information processing unit 109 as position information. The position information includes, for example, the latitude and longitude.

As the position sensor 2, a general global positioning system (GPS) receiver, a gyroscope, or other devises such as those mounted to, for example, a car navigation system or a mobile information terminal, can be used. The current position specifying unit 106 specifies the current position by performing mapping processing between the detection result of the position sensor 2 and map data stored in the map DB 108. The current position specifying unit 106 repeatedly executes acquisition and output of position information at predetermined timings continuously.

Note that the travel assistance device 100 may acquire map data from a map server on a network instead of the map data stored in the map DB 108.

Using the detection result of the position sensor 2, the travel route specifying unit 107 specifies the current travel route of the travel assistance device 100 or the moving body mounting the travel assistance device 100 and outputs the current travel route to the information processing unit 109 as road link information. Note that the travel route specifying unit 107 may specify the current travel route on the basis of position information acquired by the current position specifying unit 106 instead of the detection result of the position sensor 2. In addition, the travel route specifying unit 107 may specify not only the current traveling road but also a travel route to a destination as necessary.

At the time of generating the road link information, the travel route specifying unit 107 acquires data indicating nodes and links forming a route, data indicating the cost at each link, or other data, from the map DB 108, specifies a road link corresponding to the current traveling road or a travel route to a destination, and uses the specified road link as the road link information.

Figure 2:
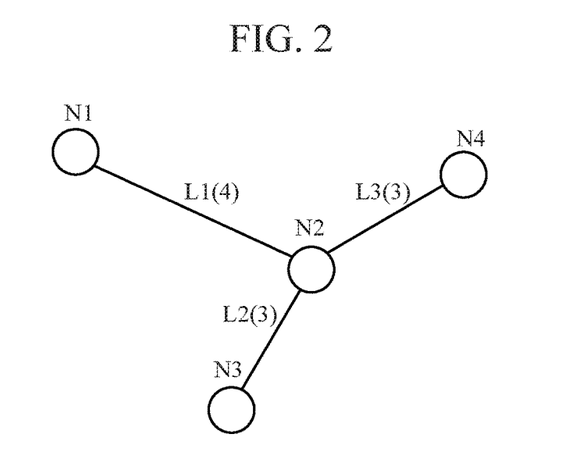
FIG. 2 is a diagram illustrating an example of a network including nodes and links.

Here, FIG. 2 is a diagram illustrating an example of a network constituted by nodes and links. In a case of a road network, for example, an intersection corresponds to a node, and a road between intersections corresponds to a link. Other networks can also be represented by nodes and links in a similar manner.

As illustrated in FIG. 2, a cost that is taken into consideration when route search is performed is given to each link. In FIG. 2, for example, the cost of a link L1 between a node N1 and a node N2 is "4", and the cost of a link L2 between the node N2 and a node N3 is "3". Note that, in the first embodiment, only one cost is represented for each link in order to simplify the explanation; however, a plurality of costs may be set for one link such as a cost in consideration of traveling time and a cost in consideration of a distance. The cost illustrated in FIG. 2 is a basic cost which will be described later.

Figure 3A:
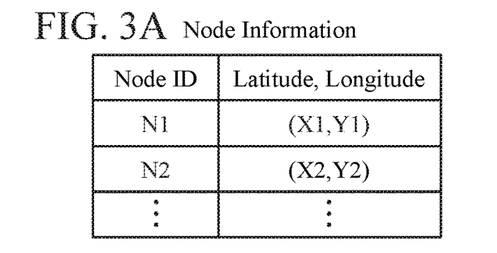
FIGS. 3A and 3B are diagrams illustrating an example of route information included in map data.
Figure 3B:
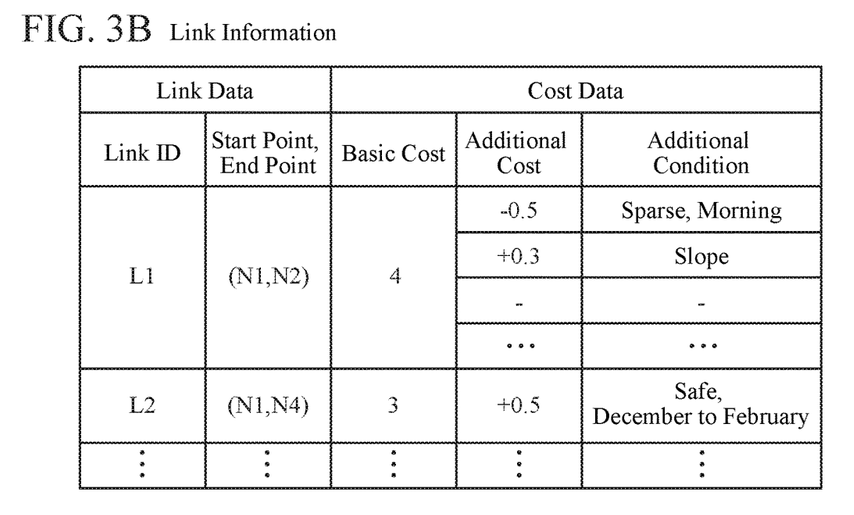

FIGS. 3A and 3B illustrate n example of route information included in the map data stored in the map DB 108. The route information includes node information illustrated in FIG. 3A and link information illustrated in FIG. 3B.

As illustrated in FIG. 3A, the node information includes a node ID for identifying each node and the latitude and longitude which are position information of each node. Note that, in addition to the latitude and longitude, other information such as the altitude may be included in the position information of a node. Further, the node information may include information such as a type and name of a node.

As illustrated in FIG. 3B, link information includes link data and cost data. The link data includes a link ID for identifying each link and a start point and an end point of the link. For example, the link data of FIG. 3B illustrates that a start point node and an end point node of the link L1 is N1 and N2, respectively.

The cost data indicates a cost of each link considered when route search is performed. The cost data includes a basic cost, an additional cost, and an additional condition. The basic cost is preset for each link, and can be updated by a system administrator, for example at a maintenance timing of the system or other timings. Note that, as described above, a plurality of basic costs having different conditions may be set for one link.

The additional cost is a cost that can be considered additionally to the basic cost upon route search. As will be described later, the additional cost is added and updated at any time during operation of the system on the basis of evaluation information transmitted to the travel assistance server 200.

The additional condition indicates a condition for applying the additional cost and is added and updated at any time together with the additional cost. The additional condition includes, for example, a condition of a period such as a date and a time zone, a priority condition such as giving higher priority to a road having less stairways or a less undulated road, giving higher priority to a safe road, and the like.

The storage unit 110 stores an evaluation information correspondence table in which keywords and evaluation are associated with each other.

Figure 4:
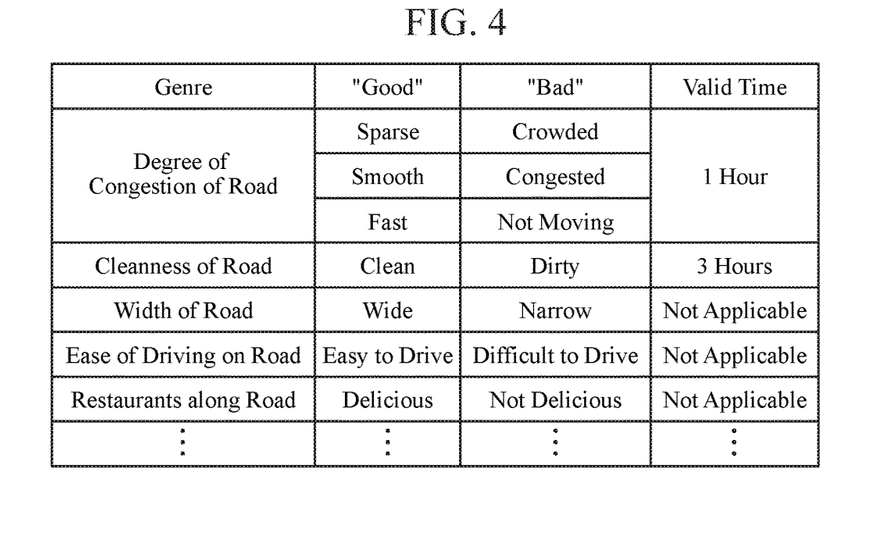
FIG. 4 is a diagram illustrating an example of an evaluation information correspondence table stored in a storage unit of the first embodiment.

FIG. 4 is a diagram illustrating an example of the evaluation information correspondence table. As illustrated in FIG. 4, evaluation includes two types of evaluation, which are "good" indicating a good impression or a positive impression for a user and "bad" indicating a bad impression or a negative impression for a user. For the evaluation "good", keywords such as "sparse", "smooth", "fast", "clean", "wide", "easy to drive", "delicious" are associated. For the evaluation "bad", keywords such as "crowded", "congested", "not moving", "dirty", "narrow", "difficult to drive", "not delicious" are associated.

Note that, in the example of FIG. 4, two types of evaluation of "good" and "bad" are defined; however, it is also possible to define more types of evaluation, for example, "excellent", "good", and "bad".

In the example of FIG. 4, a genre indicating an event or a viewpoint to be evaluated are defined for each evaluation, and thus it is possible to narrow down the evaluation from the viewpoint of "cleanliness of road", for example. In addition, for a genre of an event where the evaluation is expected to change dynamically, a valid time may be defined. For example, since evaluation on a degree of congestion and cleanliness of a road is expected to change dynamically, a valid time is set. Contrarily, since evaluation on the width of a road, an ease of driving, and restaurants along a road is not likely to change dynamically, a valid time is not set.

The information processing unit 109 manages operation upon transmitting evaluation information to the travel assistance server 200 and receiving evaluation information from the travel assistance server 200.

The reliability determining unit 111 determines reliability of evaluation information, and accordingly, determines whether the evaluation information is to be transmitted to the travel assistance server 200.

First, operation at the time of transmitting evaluation information will be described.

When receiving a recognition result from the speech information detecting unit 101, the information processing unit 109 refers to the evaluation information correspondence table stored in the storage unit 110, acquires the evaluation "good" or the evaluation "bad" corresponding to the recognition keyword in the recognition result, and generates evaluation information. The evaluation information may include not only the evaluation "good" or the evaluation "bad" but also a genre and a valid time. Subsequently, the information processing unit 109 assigns, to the generated evaluation information, at least one of the current position information or road link information received from the position information detecting unit 105. The information processing unit 109 outputs the evaluation information including at least one of the position information and the road link information to the reliability determining unit 111.

When receiving the evaluation information from the information processing unit 109, the reliability determining unit 111 accesses the SNS server 400 via the communication unit 112, which will be described later, and collects post information posted from a predetermined distance range based on the position information included in the evaluation information. The predetermined distance range based on the position information is, for example, a range of a circle with a radius of 5 km centered on the current position, or a range including a road link currently traveling on.

The post information includes texts posted by a poster, posted position information, and the date and time of the posting. Identification information for identifying the poster and information for estimating reliability of the posted content of the poster may also be included.

Note that, when a valid time is included in the evaluation information received from the information processing unit 109, the reliability determining unit 111 collects post information posted during a period from the time preceding to the current date and time by the valid time to the current date and time. For example when the valid time is three hours, post information posted during a period from the time three hours prior to the current date and time to the current date and time is collected. In a case where the evaluation information does not include a valid time, the reliability determining unit 111 may collect post information posted in a predetermined period (for example, past 5 hours) based on the current date and time. As a result, in reliability determination which will be described later, the reliability of contents uttered by a user about a dynamically changing events such as a degree of congestion of a road can be accurately determined.

Moreover, the reliability determining unit 111 may collect, on the basis of the current date and time, post information posted on the same day of the week as the current day of the week, post information posted on the same date as the current date, or post information posted in the same time zone as the current time zone. For example, when the current date is Monday, the reliability determining unit 111 collects post information posted on each Monday in the past one month including today. As a result in the reliability determination described later, reliability of contents uttered by a user about an event whose evaluation periodically changes such as a road crowded on the same day of the week every week, a road congested on the same date every month, and a road congested in the same time zone every day can be accurately determined.

Subsequently, the reliability determining unit 111 refers to the evaluation information correspondence table stored in the storage unit 110 and extracts a keyword included in the collected post information. At this time, for example, the reliability determining unit 111 decomposes posted texts in the post information into word units by morphological analysis or other analyses and determines a matching degree with each of the keywords in the evaluation information correspondence table stored in the storage unit 110.

Since words related to subjective evaluation is often an adjective such as "beautiful", by limiting words used for extracting a keyword to adjectives in the reliability determining unit 111, it is expected that efficiency of calculation can be improved. Note that, a method for decomposing posted texts into word units is not limited to the morphological analysis, and any method may be used as long as it is a method of analyzing a sentence and decomposing the sentence into words.

Then, the reliability determining unit 111 acquires the evaluation "good" or the evaluation "bad" corresponding to a keyword included in the post information from the evaluation information correspondence table. An evaluation point is set to "+1" for the evaluation "good", and an evaluation point is set to "−1" for the evaluation "bad". The reliability determining unit 111 calculates the evaluation point for each piece of the collected post information and then calculates the sum of the evaluation points.

Thereafter, when the evaluation information received from the information processing unit 109 has the evaluation "good", the reliability determining unit 111 determines to transmit the evaluation information to the travel assistance device 100 when the total value of the evaluation points is positive and determines not to transmit the evaluation information to the travel assistance device 100 and to discard the evaluation information when the total value of the evaluation points is negative. Contrarily, when the evaluation information received from the information processing unit 109 has the evaluation "bad", the reliability determining unit 111 determines to transmit the evaluation information to the travel assistance device 100 when the total value of the evaluation points is negative and determines not to transmit the evaluation information to the travel assistance device 100 and to discard the evaluation information when the total value of the evaluation points is positive.

That is, when the evaluation of the evaluation information coincides with an evaluation tendency of the post information, the evaluation information has high reliability and thus is transmitted to the travel assistance device 100. When the evaluation of the evaluation information does not coincide with the evaluation tendency of the post information, the evaluation information has low reliability and thus is discarded.

Note that, in the above descriptions, the evaluation analysis of the evaluation information is performed on the basis of a ratio of the evaluation "good" and the evaluation "bad" of the post information. However, it may be simply determined that evaluation of evaluation information matches an evaluation tendency of post information when the number of pieces of post information matching evaluation of the evaluation information is larger than or equal to a predetermined number. For example, when the evaluation information received from the information processing unit 109 has the evaluation "good", the reliability determining unit 111 determines to transmit the evaluation information when the number of pieces of post information having the evaluation "good" is larger than or equal to a predetermined number and determines to discard the evaluation information when the number of pieces of post information having the evaluation "good" is less than the predetermined number.

Further, when a genre is included in the evaluation information received from the information processing unit 109, the reliability determining unit 111 may select post information having the same genre with the evaluation information from among the collected post information and use it for determining reliability. For example, when a genre of "degree of congestion of road" is included in the evaluation information, the reliability determining unit 111 selects post information including any one of keywords of "sparse", "smooth", "fast", "crowded", "congested", and "not moving" from the collected post information. Then, the reliability determining unit 111 acquires the evaluation "good" or the evaluation "bad" for each piece of the selected post information, calculates an evaluation tendency, determines whether the evaluation tendency matches the evaluation of the evaluation information, and determines whether the evaluation information is to be transmitted.

Moreover, the reliability determining unit 111 may select post information posted by a poster having credibility higher than or equal to a predetermined threshold value from among the collected post information and use the post information for determination of reliability. For example, identification information of a poster having credibility higher than or equal to a threshold value is preset in the reliability determining unit 111. When the identification information coincides with identification information of a poster included in the post information collected from the SNS server 400, the post information is used for determination of reliability.

Alternatively, when the post information collected from the SNS server 400 includes information that enables estimation of reliability of contents of post information posted by a poster, the reliability determining unit 111 estimates credibility of the poster on the basis of the information and uses post information with credibility higher than or equal to a threshold value for determination of reliability. For example, in the case of Twitter (registered trademark), tweets of a poster with a large number of followers, tweets with a large number of retweets, or the like are regarded as having high credibility.

Moreover, the reliability determining unit 111 may select post information posted by a poster having a predetermined attribute from among the collected post information and use the post information for determination of reliability. For example, when identification information of the post information collected from the SNS server 400 corresponds with identification information of a poster set by a user, the reliability determining unit 111 uses the post information for determination of reliability. For example, post information of a poster who is a friend of the user, a poster registered as a favorite, or in the case of Twitter (registered trademark), post information of a poster the user is following or following the user is regarded as having high credibility.

As a result, it is possible to specify a poster who has a certain relationship of trust with the user or a poster who tends to post reliable information, and thus it is expected to increase the accuracy of reliability determination of the evaluation information.

Note that the reliability determining unit 111 may collect only post information meeting conditions of the position information of posting, the date and time of posting, a genre of the post information, the credibility of the poster, or the like from the SNS server 400 or may select post information meeting the above conditions after collecting post information from the SNS server 400.

Next, operations at the time of receiving evaluation information will be described.

The information processing unit 109 requests evaluation information within a predetermined distance range based on the current position information received from the position information detecting unit 105 to the travel assistance server 200 via the communication unit 112. The information processing unit 109 further receives evaluation information transmitted by the travel assistance server 200 in response to this request via the communication unit 112.

The predetermined distance range based on the position information is, for example, a range of a circle with a radius of 1 km centered on the current position, or a range corresponding to the current road link. When the evaluation information is displayed to be superimposed on map data, the distance range is made to be larger than a display range of the map.

Furthermore, the information processing unit 109 may request evaluation information within a predetermined time range based on the current date and time. The predetermined time range based on the current date and time is, for example, a time range in consideration of valid time or the like set in the evaluation information correspondence table. Furthermore, the information processing unit 109 may request, on the basis of the current date and time, evaluation information on the same day of the week as the current day of the week, the same date as the current date, or the same time zone as the current time zone. By receiving evaluation information by designating the day of the week or the date and time, it is possible to estimate an occurrence tendency such as a cycle of traffic congestion of a certain road from the received evaluation information.

The information processing unit 109 outputs the evaluation information received from the travel assistance server 200 to the information providing unit 113. Note that, when the evaluation information is displayed to be superimposed on map data, the information processing unit 109 acquires map data within a predetermined distance range based on the current position information received from the current position specifying unit 106 from the map DB 108 and outputs the map data to the information providing unit 113 together with the evaluation information received from the travel assistance server 200.

When a valid time is included in the evaluation information received from the travel assistance server 200, the information processing unit 109 may display only valid evaluation information to be superimposed on the map data after determining whether the current date and time is within the valid time.

The communication unit 112 receives the evaluation information determined to be transmitted by the reliability determining unit 111 and transmits the evaluation information to the travel assistance server 200 via the mobile communication network 300. The communication unit 112 may transmit the evaluation information each time the evaluation information is generated and determined to be transmitted, or may accumulate the evaluation information and collectively transmit the evaluation information at a constant cycles. The communication unit 112 receives evaluation information from the travel assistance server 200 via the mobile communication network 300 in accordance with an instruction from the information processing unit 109.

Further, the communication unit 112 receives post information from the SNS server 400 via the mobile communication network 300 in accordance with an instruction from the reliability determining unit 111.

The mobile communication network 300 is, for example, 3G or long term evolution (LTE) or the like, and the communication unit 112 performs wireless communication with the mobile communication network 300, thereby implementing information transfer between the travel assistance server 200 and the SNS server 400.

The information providing unit 113 displays the evaluation information received from the information processing unit 109 on the display 3. For example, the information providing unit 113 receives the evaluation information and the map data from the information processing unit 109 and displays the evaluation information to be superimposed on the map data on the basis of the position information or the road link information included in the evaluation information, thereby assisting travel of the moving body.

Further, the information providing unit 113 may perform travel assistance by setting an additional cost of a link using the evaluation information, searching for a route having many pieces of evaluation information of the evaluation "good" preferentially, and notifying the route to the user.

Figure 5A:
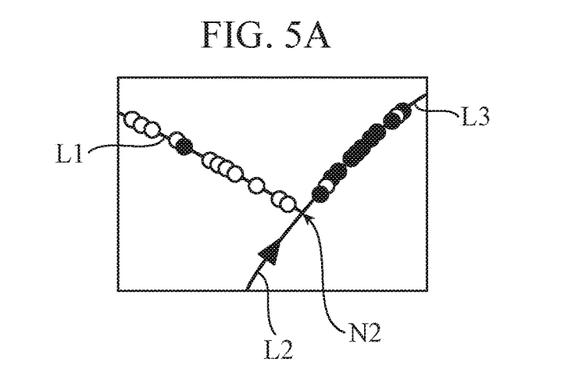
FIGS. 5A and 5B are diagrams illustrating display examples of evaluation information displayed on a display by an information providing unit of the first embodiment.
Figure 5B:
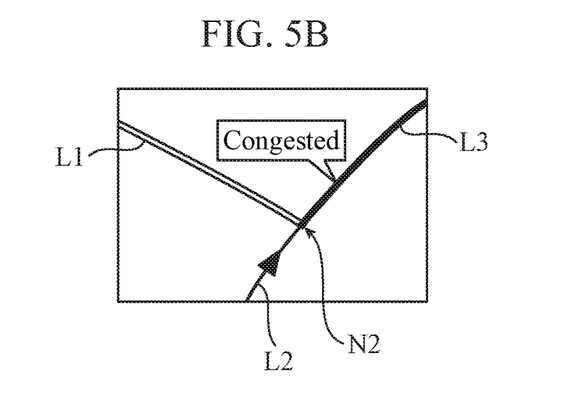

FIGS. 5A and 5B are diagrams illustrating display examples of evaluation information. Here, a case where a large number of pieces of evaluation information received from the travel assistance server 200 is displayed to be superimposed on map data including roads of the links L1, L2, and L3 will be described. The moving body is traveling on the road of L2.

In the display example of FIG. 5A, evaluation information of the evaluation "good" is mapped with an open circle, and evaluation information of the evaluation "bad" is mapped with a filled circle. In this display example, the evaluation information is mapped and visualized on the basis of the position information included in the evaluation information; alternatively, visualization can be performed on the basis of, for example, changing the color of the road and the like. This example is illustrated in FIG. 5B.

In the display example of FIG. 5B, since there are more pieces of the evaluation information of the evaluation "good" than the pieces of the evaluation information of the evaluation "bad" in the link L1, the road of the link L1 is represented in white color indicating the evaluation "good". Contrarily, since there are more pieces of the evaluation information of the evaluation "bad" than the pieces of the evaluation information of the evaluation "good" in the link L3, the road of the link 13 is represented in black color indicating the evaluation "bad".

Further, it is possible to notify the user of details of the evaluation information. In the display example of FIG. 5B, there are many pieces of evaluation information having the genre of "degree of congestion of road" and the evaluation "bad" on the link L3, and thus, for example, an icon of "congested" is displayed. It is assumed that data such as icons for display is defined in the information providing unit 113 in advance.

Moreover, when the information processing unit 109 estimates, for example, a cycle in which a certain road becomes congested from the received evaluation information, the information providing unit 113 may perform display showing details of the evaluation information such as "Tends to be congested every Monday" on the basis of the estimated cycle.

The above descriptions are merely some examples and display modes of evaluation information are not limited by the descriptions. Note that the information providing unit 113 may receive information indicating settings of a display mode from a user and display the evaluation information on the display 3 in the display mode according to the settings.

The travel assistance server 200 includes an arithmetic processing unit 201 and an accumulation unit 202. The arithmetic processing unit 201 receives evaluation information transmitted from the travel assistance device 100 of each moving body via the mobile communication network 300 and stores the evaluation information in the accumulation unit 202.

When there is a request for evaluation information from the travel assistance device 100 of any moving body via the mobile communication network 300, the arithmetic processing unit 201 acquires evaluation information matching the request from the accumulation unit 202 and transmits the evaluation information to the travel assistance device 100 having made the request via the mobile communication network 300.

Note that, when a valid time is set to evaluation information, the arithmetic processing unit 201 may delete evaluation information the valid time of which has elapsed from the accumulation unit 202.

The accumulation unit 202 stores evaluation information. Under control by the arithmetic processing unit 201, evaluation information is read out from the accumulation unit 202 or written in the accumulation unit 202 as required.

Next, operations of the travel assistance device 100 will be described. In order to facilitate understanding of the operations, processing at the time of generating evaluation information and processing at the time of using evaluation information are described separately.

Figure 6:
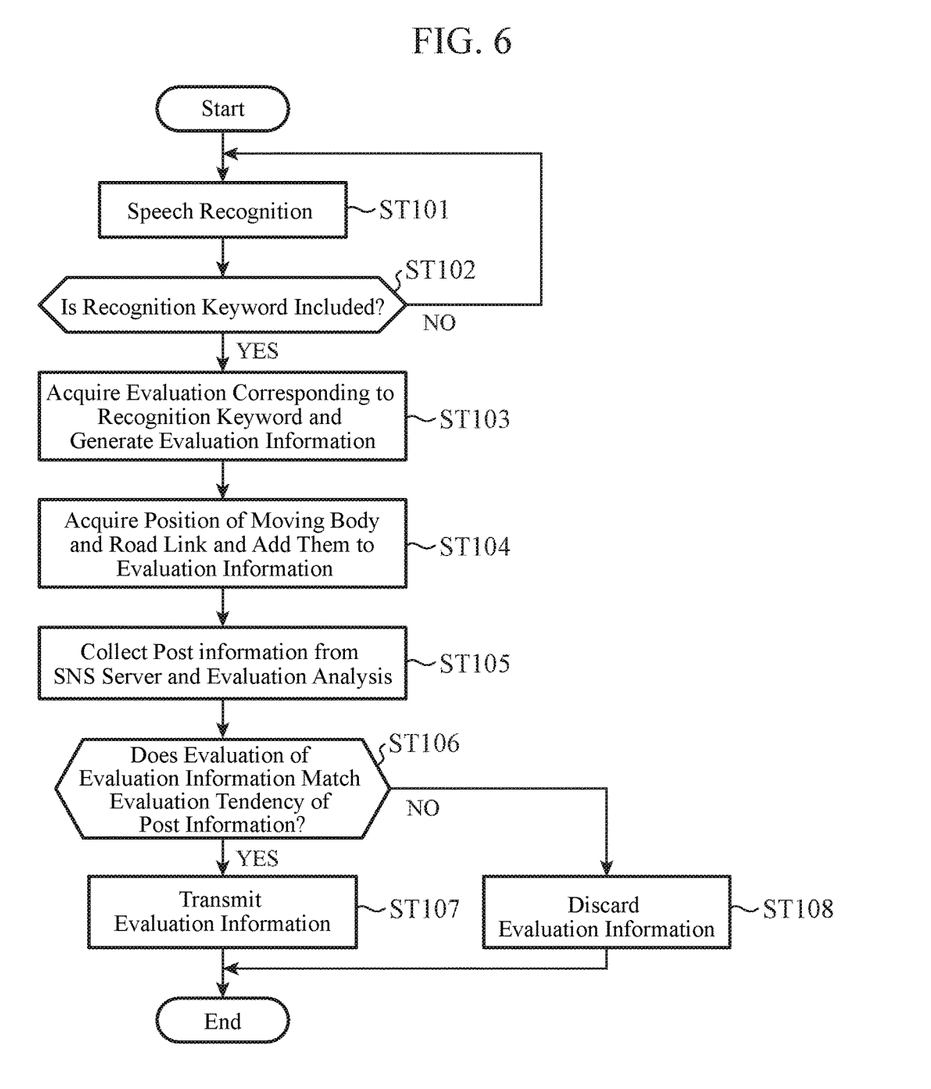
FIG. 6 is a flowchart illustrating exemplary operations when a travel assistance device according to the first embodiment generates evaluation information.
Figure 7:
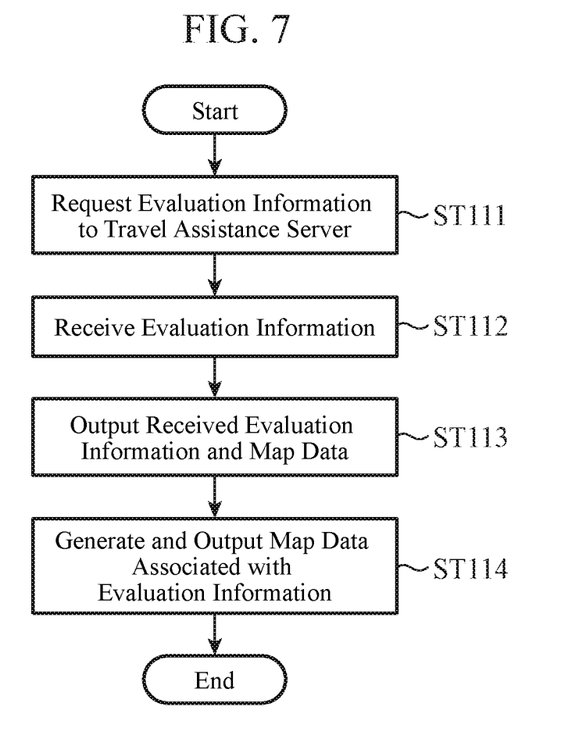
FIG. 7 is a flowchart illustrating exemplary operations when the travel assistance device according to the first embodiment uses evaluation information.

FIG. 6 is a flowchart illustrating exemplary operations when the travel assistance device 100 generates evaluation information. FIG. 7 is a flowchart illustrating exemplary operations when the travel assistance device 100 uses evaluation information.

First, exemplary operations when the travel assistance device 100 generates evaluation information will be described with reference to FIG. 6.

In the speech information detecting unit 101, the sound acquiring unit 102 A/D converts sound input from the microphone 1 and acquires the sound as a sound signal, and the speech section detecting unit 103 detects a speech section from the sound signal and extracts speech data. The speech recognition unit 104 then recognizes the speech data using the speech recognition dictionary to obtain a recognition result (step ST101). If a keyword used by the information processing unit 109, that is, the recognition keyword described above is included in the recognition result ("YES" in step ST102), the speech recognition unit 104 outputs the recognition keyword to the information processing unit 109. Contrarily, if no recognition keyword is included in the recognition result ("NO" in step ST102), the speech recognition unit 104 discards the recognition result, and the speech information detecting unit 101 executes the processing of step ST101 again.

Upon receiving a recognition keyword from the speech recognition unit 104, the information processing unit 109 refers to the evaluation information correspondence table in the storage unit 110, acquires the evaluation "good" or the evaluation "bad" corresponding to the recognition keyword, and generates the evaluation information (step ST103). Note that evaluation information may include not only evaluation but also a genre or a valid time.

Subsequently, the information processing unit 109 adds at least one of the current position information received from the current position specifying unit 106 or the current road link information received from the travel route specifying unit 107 to the evaluation information generated in step ST103 and outputs the evaluation information to the reliability determining unit 111 (step ST104).

Upon receiving the evaluation information from the information processing unit 109, the reliability determining unit 111 collects post information from the SNS server 400 via the communication unit 112, calculates an evaluation tendency of the post information, and determines whether evaluation of the evaluation information matches the evaluation tendency of the post information (step ST105). If the evaluation of the evaluation information matches the evaluation tendency of the post information ("YES" in step ST106), the reliability determining unit 111 transmits the evaluation information to the travel assistance device 100 via the communication unit 112 (step ST107). Contrarily, if the evaluation of the evaluation information does not match the evaluation tendency of the post information ("NO" in step ST106), the reliability determining unit 111 discards the evaluation information (step ST108).

Note that, as described above, since the travel assistance device 100 always recognizes utterance of the user, in order to prepare for next utterance of the user, the flow returns to step ST101 after the processing of step ST107 or step ST108 is completed. Then the speech information detecting unit 101 restarts capturing and recognizing the next uttered speech of the user.

Since the travel assistance device 100 recognizes utterance of the user and generates evaluation information as described above, there is a possibility of generating evaluation information having contents different from an actual situation due to misrecognition or the like. However, by determining reliability of the evaluation information using post information in the SNS server 400, it is possible to transmit only evaluation information with high reliability to the travel assistance server 200.

Next, exemplary operations when the travel assistance device 100 uses evaluation information will be described with reference to FIG. 7. The travel assistance device 100 repeats operations illustrated in FIG. 7 at a constant cycle for example.

The information processing unit 109 requests evaluation information to the travel assistance server 200 via the communication unit 112 (step ST111). As a request for evaluation information, for example, it is possible to obtain evaluation information within a certain time range from the time of making a request and within a certain distance range from the position of making the request.

Subsequently, the communication unit 112 receives the evaluation information transmitted by the travel assistance server 200 in response to this request and outputs the evaluation information to the information processing unit 109 (step ST112). The information processing unit 109 acquires map data from the map DB 108 and outputs the map data to the information providing unit 113 together with the evaluation information received from the communication unit 112 (step ST113). The information providing unit 113 generates map data added with evaluation information as illustrated in FIGS. 5A and 5B, for example, using the evaluation information and the map data received from the information processing unit 109 and outputs the map data added with evaluation information to the display 3 (step ST114). The display 3 displays the map data added with evaluation information received from the information providing unit 113.

Next, operations of the travel assistance server 200 will be described. In order to facilitate understanding of the operations, processing at the time of receiving evaluation information and processing at the time of transmitting evaluation information thereof are described separately.

Figure 8:
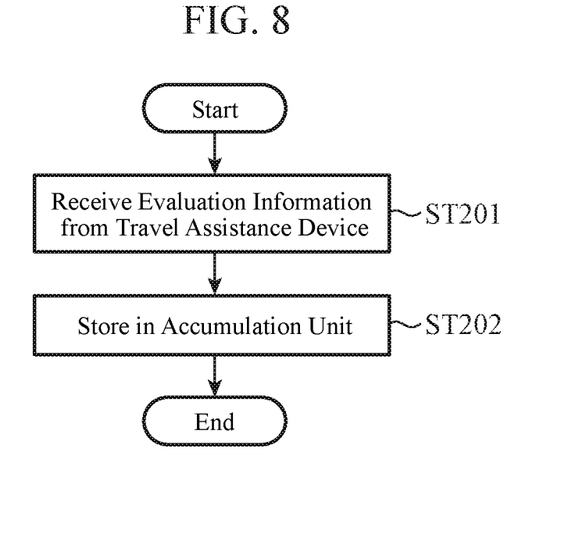
FIG. 8 is a flowchart illustrating exemplary operations when a travel assistance server according to the first embodiment receives evaluation information.
Figure 9:
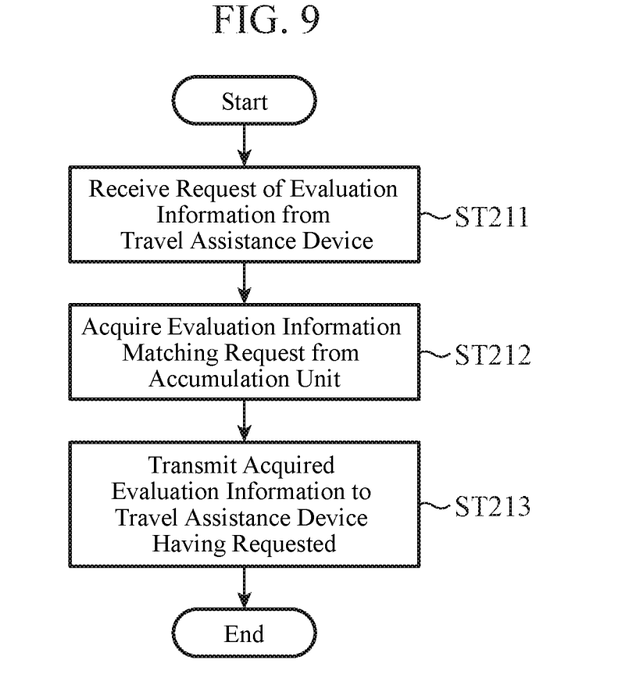
FIG. 9 is a flowchart illustrating exemplary operations when the travel assistance server according to the first embodiment transmits evaluation information.

FIG. 8 is a flowchart illustrating exemplary operations when the travel assistance server 200 receives evaluation information from the travel assistance device 100. FIG. 9 is a flowchart illustrating exemplary operations when the travel assistance server 200 transmits evaluation information to the travel assistance device 100.

First, exemplary operations when the travel assistance server 200 receives evaluation information will be described with reference to FIG. 8.

The arithmetic processing unit 201 of the travel assistance server 200 receives evaluation information transmitted from the travel assistance device 100 (step ST201). The arithmetic processing unit 201 assigns a unique ID to each piece of the received evaluation information to facilitate management of the evaluation information. Then, the arithmetic processing unit 201 stores the evaluation information to which IDs are assigned in the accumulation unit 202 (step ST202).

Next, exemplary operations when the travel assistance server 200 transmits evaluation information will be described with reference to FIG. 9.

The arithmetic processing unit 201 of the travel assistance server 200 receives a request for evaluation information transmitted from the travel assistance device 100 (step ST211). As a request for evaluation information, for example, it is possible to obtain evaluation information within a certain time range from the time of making a request and within a certain distance range from the position of making the request. The arithmetic processing unit 201 acquires evaluation information corresponding to contents of the request from the accumulation unit 202 (step ST212). Then, the arithmetic processing unit 201 transmits the evaluation information acquired from the accumulation unit 202 to the travel assistance device 100 having made the request (step ST213).

Note that it is also preferable that the arithmetic processing unit 201 analyzes evaluation information stored in the accumulation unit 202 and estimates a cycle in which evaluation on an event such as a degree of congestion of a road changes and, when there is a request for evaluation information from the travel assistance device 100, not only evaluation information corresponding to contents of the request but also past evaluation information based on the estimated cycle is additionally transmitted to the travel assistance device 100.

Figure 10:
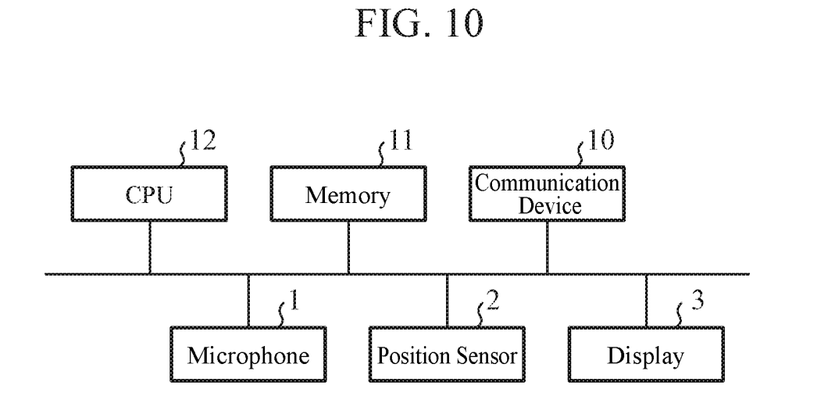
FIG. 10 is a diagram illustrating a hardware configuration example of the travel assistance device according to the first embodiment.

Next, an exemplary hardware configuration of the travel assistance device 100 will be described with reference to a hardware configuration diagram of FIG. 10.

The communication unit 112 in the travel assistance device 100 corresponds to a communication device 10. The map DB 108 and the storage unit 110 in the travel assistance device 100 correspond to a memory 11. Each of the functions of the sound acquiring unit 102, the speech section detecting unit 103, the speech recognition unit 104, the current position specifying unit 106, the travel route specifying unit 107, the information processing unit 109, the reliability determining unit 111, and the information providing unit 113 in the travel assistance device 100 is implemented by a processing circuit. The processing circuit is a central processing unit (CPU) 12, a central processing device, a processing device, an arithmetic device, a microprocessor, a microcomputer, a digital signal processor (DSP), or the like for executing programs stored in the memory 11.

Each of the functions of the sound acquiring unit 102, the speech section detecting unit 103, the speech recognition unit 104, the current position specifying unit 106, the travel route specifying unit 107, the information processing unit 109, the reliability determining unit 111, and the information providing unit 113 is implemented by software, firmware, or a combination of software and firmware. Software and firmware are each described as a program and stored in the memory 11. The CPU 12 reads out and executes programs stored in the memory 11 and thereby implements respective functions of the units. That is, the travel assistance device 100 includes the memory 11 for storing programs for performing the processing illustrated in the flowcharts of FIGS. 6 and 7 when executed by the CPU 12. In other words, the program causes a computer to execute procedures or methods of the respective units described above.

Here, the memory 11 may be a nonvolatile or volatile semiconductor memory such as a random access memory (RAM), a read only memory (ROM), a flash memory, an erasable programmable ROM (EPROM), an electrically EPROM (EEPROM), a solid state drive (SSD) or the like, a magnetic disk such as a hard disk, a flexible disk or the like, or an optical disk such as a mini disk, a compact disc (CD), a digital versatile disc (DVD) or the like.

Although not illustrated, the arithmetic processing unit 201 in the travel assistance server 200 is implemented by a CPU for executing programs stored in a memory. The accumulation unit 202 in the travel assistance server 200 is a memory.

As described above, according to the first embodiment, the travel assistance device 100 includes: a speech information detecting unit 101 acquiring and recognizing uttered speech of the user and outputting a recognition keyword; an information processing unit 109 generating the evaluation information from the recognition keyword; a position information detecting unit 105 detecting a position where the evaluation information is generated; a reliability determining unit 111 determining reliability of the evaluation information using post information posted on the Internet such as an SNS server 400 within a predetermined distance range based on the position where the evaluation information is generated within a predetermined period based on current date and time and determining whether the evaluation information is to be transmitted; a communication unit 112 performing transmission, to the travel assistance server 200, of the evaluation information determined to be transmitted by the reliability determining unit 111, reception of the evaluation information stored in the travel assistance server 200, and reception of the post information posted on the Internet; and an information providing unit 113 providing the evaluation information received by the communication unit 112 from the travel assistance server 200. As a result, it is possible to improve reliability of evaluation information on an event a situation of which changes as time lapses such as traffic congestion of a road and road closing. Further, it is possible to automatically generate evaluation information with high reliability from a recognition result without requiring special operation by a user.

According to the first embodiment, the reliability determining unit 111 determines the reliability of the evaluation information using the post information posted by a poster having credibility higher than or equal to a predetermined threshold value out of the post information posted on the Internet. As a result, the accuracy of determination of reliability of evaluation information is expected to be improved.

Furthermore, according to the first embodiment, the reliability determining unit 111 determines the reliability of the evaluation information using the post information posted by a poster having a predetermined attribute out of the post information posted on the Internet. As a result, the accuracy of determination of reliability of evaluation information is expected to be improved.

Furthermore, according to the first embodiment, the information processing unit 109 sets a valid time for each genre of the evaluation information, and the reliability determining unit 111 determines the reliability of the evaluation information using the post information posted on the Internet within the valid time set to the evaluation information based on current date and time. Therefore, in a case where evaluation is expected to dynamically change, reliability of evaluation information can be accurately determined using valid post information before the evaluation changes.

Furthermore, according to the first embodiment, the reliability determining unit 111 determines the reliability of the evaluation information using the post information of which at least one of a day of a week, a date, and a time zone of the posting is the same as at least one of a current day of a week, a current date, and a current time zone out of the post information posted on the Internet. Therefore, when it is expected that there is periodicity in dynamic changes of evaluation, reliability of evaluation information can be accurately determined using valid post information for every cycle.

Furthermore, according to the first embodiment; the information processing unit 109 adds the valid time, which is stored in the travel assistance server 200, to each piece of the evaluation information. Therefore, when evaluation is expected to change dynamically, evaluation information whose reliability has been decreased can be deleted from the travel assistance server 200.

Furthermore, according to the first embodiment, the reliability determining unit 111 determines the reliability of the evaluation information using the post information of a same genre as a genre of the evaluation information out of the post information posted on the Internet. Therefore, it is possible to improve accuracy of determination of reliability of evaluation information.

Furthermore, according to the first embodiment; the position information detecting unit 105 detects at least one of latitude and longitude and a road link as a position where evaluation information is generated, and the information processing unit 109 adds at least one of latitude and the longitude and road link detected by the position information detecting unit 105 to the evaluation information. Therefore, it is possible to assist traveling such as charging a travel route using evaluation information and information of a road link.

Furthermore, according to the first embodiment, the information providing unit 113 adds the evaluation information received from the travel assistance server 200 to map data and displays the evaluation information with the map data. This allows a user to stop by at a point where the user wants to pass again or to avoid a point where the user does not want pass again without requiring the user to intentionally remember evaluation of each point, thereby enabling assistance of comfortable traveling of the user.

Furthermore, according to the first embodiment, the information providing unit 113 changes a display mode of the evaluation information received from the travel assistance server 200 in accordance with contents of the evaluation information such as "good" or "bad". Therefore, it is possible to display evaluation of each point to be easily understood.

Furthermore, according to the first embodiment, the information providing unit 113 displays details of the evaluation information received from the travel assistance server 200 by an icon such as "congested". Therefore, it is possible to display details of evaluation of each point to be easily understood.

Note that, although the travel assistance device 100 directly acquires post information from the SNS server 400 via the mobile communication network 300 in the first embodiment, the travel assistance server 200 may acquire post information from the SNS server 400 and provide the post information to the travel assistance device 100 via the mobile communication network 300. In this configuration, when there is a change in specifications of the SNS server 400, it is only required to change specifications of the travel assistance server 200 and it is not required to change specifications of the individual travel assistance devices 100.

Figure 11:
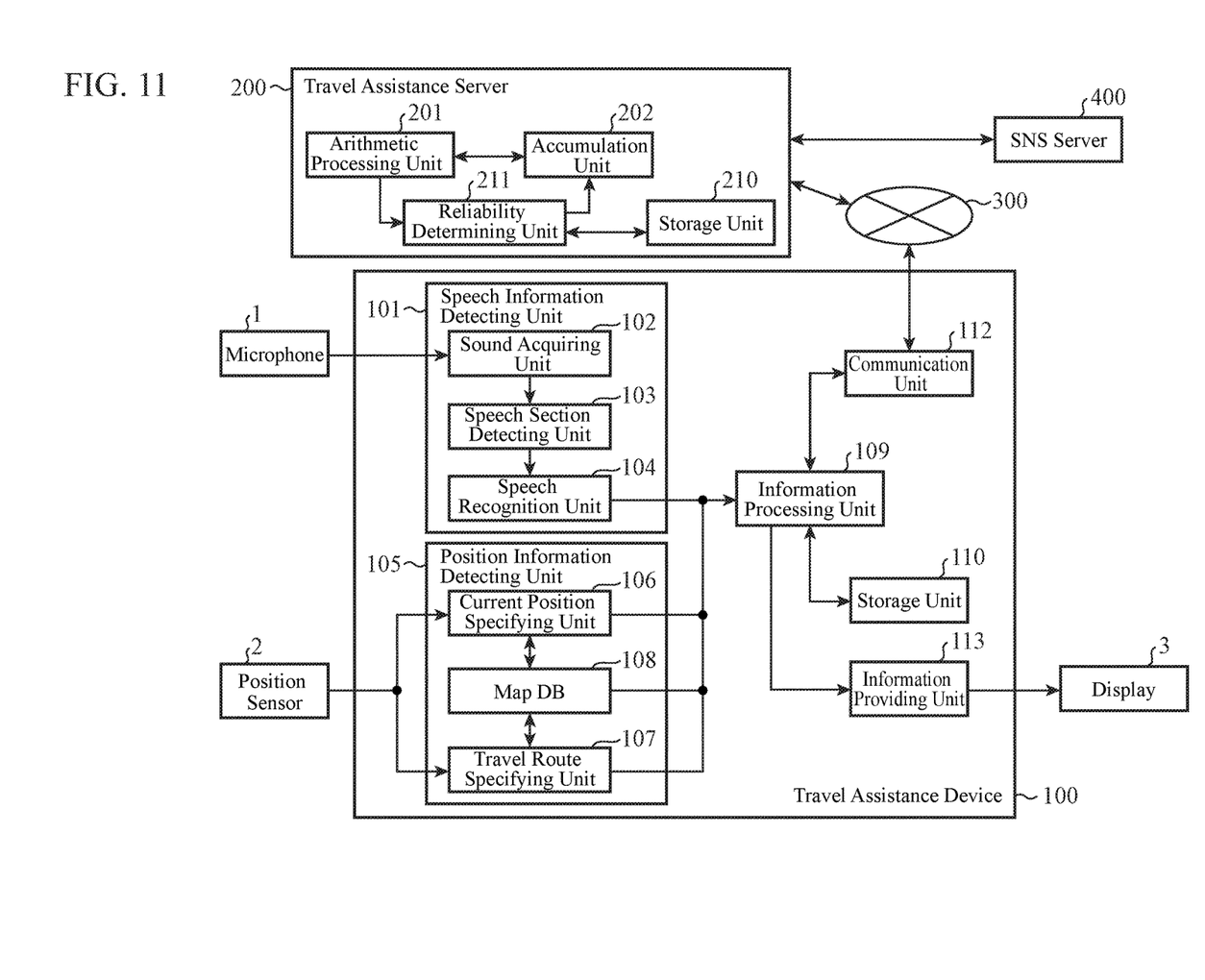
FIG. 11 is a block diagram illustrating a modification of the travel assistance system according to the first embodiment.

Further, although determination of reliability of the evaluation information is performed by the reliability determining unit 111 of the travel assistance device 100 in the first embodiment, the determination of reliability may be performed by the travel assistance server 200. FIG. 11 is a diagram illustrating a modification of the travel assistance system according to the first embodiment. In the modification of FIG. 11, a travel assistance server 200 includes a storage unit 210 storing an evaluation information correspondence table as illustrated in FIG. 4 and a reliability determining unit 211 for determining reliability of evaluation information received from a travel assistance device 100 by an arithmetic processing unit 201 and determining whether to store the evaluation information in an accumulation unit 202.

When acquiring evaluation and the like corresponding to a recognition keyword and generating evaluation information using the evaluation information correspondence table stored in the storage unit 110, the information processing unit 109 of the travel assistance device 100 transmits the evaluation information to the travel assistance server 200 via the communication unit 112.

Upon receiving the evaluation information from the travel assistance device 100, the arithmetic processing unit 201 of the travel assistance server 200 outputs the evaluation information to the reliability determining unit 211. Upon receiving the evaluation information from the arithmetic processing unit 201, the reliability determining unit 211 accesses the SNS server 400 like the reliability determining unit 111 of the first embodiment does and collects post information posted from within a predetermined distance range based on position information included in the evaluation information within a predetermined period based on the current date and time. Then, the reliability determining unit 211 calculates an evaluation tendency of the collected post information using the evaluation information correspondence table stored in the storage unit 210 and, when the evaluation of the evaluation information matches the evaluation tendency of the post information, stores the evaluation information in the accumulation unit 202, and if it does not match, discards the evaluation information.

Note that a timing when the reliability determining unit 211 performs determination of reliability of evaluation information may be appropriately set such as, for example, every time evaluation information is received from the travel assistance device 100 or every time evaluation information is transmitted in response to a request from the travel assistance device 100, or at a constant cycle in the background processing.

In the example of FIG. 11, the travel assistance device 100 generates evaluation information from a recognition keyword and transmits the evaluation information to the travel assistance server 200. However, the present invention is not limited to this configuration, and the travel assistance device 100 may transmit the recognition keyword to the travel assistance server 200, and the travel assistance server 200 may generate evaluation information from this recognition keyword. In this configuration, in the travel assistance device 100, the storage unit 110 for storing the evaluation information correspondence table is unnecessary.

Note that, within the scope of the present invention, the present invention may include a modification of any component of the respective embodiments, or an omission of any component of embodiments.

INDUSTRIAL APPLICABILITY

The travel assistance device according to the present invention is designed to transmit evaluation information with high reliability to the travel assistance server and receive evaluation information with high reliability stored in the travel assistance server and provides the evaluation information to a user. Therefore, the travel assistance device according to the present invention is suitable for use as a travel assistance device for a moving body such as a person, a vehicle, a railway vehicle, a ship, an aircraft, or the like and in particular, for use as a travel assistance device suitable for bringing in or mounting on a vehicle.

REFERENCE SIGNS LIST

1: Microphone, 2: Position sensor, 3: Display, 10: Communication device, 11: Memory, 12: CPU, 100: Travel assistance device, 101: Speech information detecting unit, 102: Sound acquiring unit, 103: Speech section detecting unit, 104: Speech recognition unit, 105: Position information detecting unit, 106: Current position specifying unit, 107: Travel route specifying unit, 108: Map DB, 109: Information processing unit, 110, 210: Storage unit, 111, 211: Reliability determining unit, 112: Communication unit, 113: Information providing unit, 200: Travel assistance server, 201: Arithmetic processing unit, 202: Accumulation unit, 300: Mobile communication network, 400: SNS server.

The invention claimed is:

1. A travel assistance device generating evaluation information, transmitting the evaluation information to a travel assistance server, receiving the evaluation information stored in the travel assistance server, and providing the evaluation information to a user travelling in a moving body, the travel assistance device comprising:

a speech information detector acquiring and recognizing uttered speech of the user and outputting a recognition result of the recognizing;

an information processor generating the evaluation information from the recognition result;

a position information detector detecting a position where the evaluation information is generated;

a reliability determiner determining reliability of the evaluation information using post information posted on the Internet within a predetermined distance range based on the position where the evaluation information is generated within a predetermined period based on current date and time and determining whether the evaluation information is to be transmitted;

a communicator performing transmission, to the travel assistance server, of the evaluation information determined to be transmitted by the reliability determiner, reception of the evaluation information stored in the travel assistance server, and reception of the post information posted on the Internet; and an information provider providing the evaluation information received by the communicator from the travel assistance server and notifies the evaluation information to the user to assist travelling of the moving body.

2. The travel assistance device according to claim 1, wherein the reliability determiner determines the reliability of the evaluation information using the post information posted by a poster having credibility higher than or equal to a predetermined threshold value out of the post information posted on the Internet.

3. The travel assistance device according to claim 1, wherein the reliability determiner determines the reliability of the evaluation information using the post information posted by a poster having a predetermined attribute out of the post information posted on the Internet.

4. The travel assistance device according to claim 1, wherein the information processor sets a valid time for each genre of the evaluation information, and the reliability determiner determines the reliability of the evaluation information using the post information posted on the Internet within the valid time set to the evaluation information based on current date and time.

5. The travel assistance device according to claim 1, wherein the reliability determiner determines the reliability of the evaluation information using the post information of which at least one of a day of a week, a date, and a time zone of the posting is the same as at least one of a current day of a week, a current date, and a current time zone out of the post information posted on the Internet.

6. The travel assistance device according to claim 1, wherein the information processor adds the valid time, which is stored in the travel assistance server, to each piece of the evaluation information.

7. The travel assistance device according to claim 1, wherein the reliability determiner determines the reliability of the evaluation information using the post information of a same genre as a genre of the evaluation information out of the post information posted on the Internet.

8. The travel assistance device according to claim 1, wherein the position information detector detects at least one of latitude and longitude and a road link as a position where evaluation information is generated, and the information processor adds at least one of latitude and the longitude and road link detected by the position information detector to the evaluation information.

9. The travel assistance device according to claim 1, wherein the information provider adds the evaluation information received from the travel assistance server to map data and displays the evaluation information with the map data.

10. The travel assistance device according to claim 9, wherein the information provider changes a display mode of the evaluation information received from the travel assistance server in accordance with contents of the evaluation information.

11. The travel assistance device according to claim 9, wherein the information provider displays details of the evaluation information received from the travel assistance server.

12. A travel assistance server receiving and storing evaluation information from one or more travel assistance devices and, when there is a request from any one of the one or more travel assistance devices, transmitting the evaluation information stored in the travel assistance server to a travel assistance device having made the request among the one or more travel assistance devices to assist a user travelling in a moving body, the travel assistance server comprising:

a reliability determiner determining reliability of the evaluation information using post information posted on the Internet within a predetermined distance range based on a position where the evaluation information is generated within a predetermined period based on a current date and time and determining whether to store the evaluation information when the evaluation information is received from the travel assistance device; and a storage storing the evaluation information determined to be stored by the reliability determiner;

wherein the travel assistance server stores the evaluation information to facilitate notifying the evaluation information to the user to assist travelling of the moving body.

13. A travel assistance system to assist a user in travelling in a moving body, comprising:

a travel assistance server; and a travel assistance device generating evaluation information, transmitting the evaluation information to the travel assistance server, receiving the evaluation information stored in the travel assistance server, and providing the evaluation information to a user, wherein either one of the travel assistance server and the travel assistance device comprises a reliability determiner determining reliability of the evaluation information using post information posted on the Internet within a predetermined distance range based on a position where the evaluation information is generated within a predetermined period based on a current date and time, wherein the travel assistance system notifies the evaluation information to the user to assist travelling of the moving body.

* * * * *